(No Model.) 6 Sheets—Sheet 1.
P. H. A. GAILLET.
APPARATUS FOR PURIFYING WATER.

No. 563,660. Patented July 7, 1896.

(No Model.) 6 Sheets—Sheet 4.

P. H. A. GAILLET.
APPARATUS FOR PURIFYING WATER.

No. 563,660. Patented July 7, 1896.

FIG. 18.

Witnesses:
John Buckler,
S. C. Connor

Inventor:
Paul Henri Auguste Gaillet,
By Howson & Howson
Attorneys.

UNITED STATES PATENT OFFICE.

PAUL HENRI AUGUSTE GAILLET, OF LILLE, FRANCE.

APPARATUS FOR PURIFYING WATER.

SPECIFICATION forming part of Letters Patent No. 563,660, dated July 7, 1896.

Application filed September 4, 1894. Serial No. 522,129. (No model.) Patented in France May 20, 1893, No. 230,239, and in England November 20, 1893, No. 22,176.

*To all whom it may concern:*

Be it known that I, PAUL HENRI AUGUSTE GAILLET, engineer, a citizen of the Republic of France, residing in Lille, (Nord,) France, have invented certain Improvements in Apparatus for Purifying and Clarifying Water, (for which I have obtained a French patent, dated May 20, 1893, No. 230,239, and a British patent, dated November 20, 1893, No. 22,176,) of which the following is a specification.

This invention relates to improvements in methods and apparatus for purifying and clarifying water. These improvements, the object of which has been to create a practically automatic apparatus, comprise, first, arrangements for controlling the supply of and distributing the water and reagents enabling that regularity and proportionality to be obtained which are the indispensable conditions on which the attainment of a uniform and satisfactory result depends; second, an arrangement for the preparation of saturated lime-water, permitting the apparatus to be supplied with the quantity of lime necessary for several days' operation; third, an arrangement enabling the residues to be uniformly and automatically discharged after the purification of a predetermined volume of water, without any assistance from hand-labor; fourth, an arrangement for continuous decantation by keeping the water absolutely at rest part of the time, and by causing it to circulate in thin sheets between the decanting-diaphragms while being drawn off, such arrangement permitting perfectly satisfactory clarification to be obtained without the employment of any filter, such clarification being just as complete as that performed while the water is kept absolutely at rest. These several arrangements, and the complete apparatus which they constitute, are described with reference to the accompanying drawings, in which—

Fig. 9 is a view, partly in section, illustrating an automatic discharge. Fig. $9^a$ is a detail view of the cock $r$ shown in Fig. 9. Figs. 11, 12, and 13 are sectional views of modifications of the arrangement for alternating the supply of liquid to the different compartments of the decanter.

Figure 1:
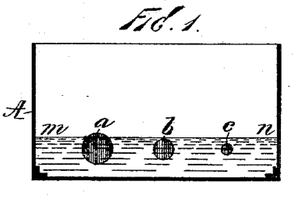
Figures 1 and 2 are cross-sections showing simple forms of the tank or trough A, which distributes the water to be treated.
Figure 2:
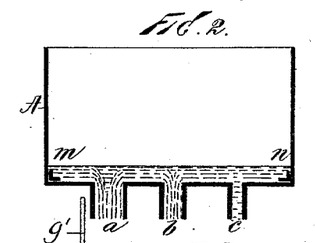

Referring to Figs. 1 and 2, the trough or tank situated at the upper part of the apparatus comprises three orifices or outlets $a\ b\ c$, which may be arranged on one side thereof, all on the same level, Fig. 1, or at the bottom, Fig. 2. One of these orifices, $a$, is adapted to feed water to be purified, the second, $b$, is to feed a proportionate amount of water to be saturated with lime, and the third, $c$, is to supply a quantity of water intended exactly to regulate the supply of the solution of soda by either displacing or dissolving that reagent, as shall be more fully explained farther on. These three orifices $a$, $b$, and $c$ discharge the water rising to the level $m\ n$, which may either be constant or vary at will. In either case the treble supply will remain exactly proportional.

Figure 3:
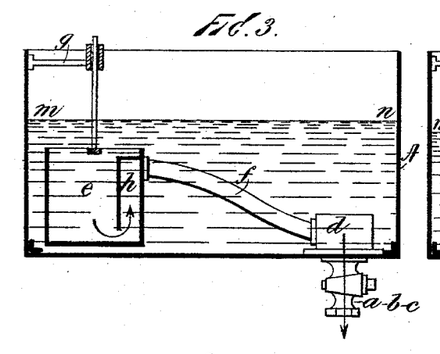
Figs. 3 and 4 are sections of the preferred form of tank A.
Figure 4:
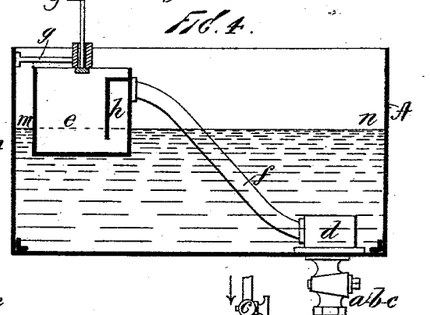

When the quantity of water in the vat or tank is sufficient, the supply therefrom will be regular, whereas, if for any reason that quantity of water entering the tank A is not sufficient to keep the level above the orifices and these orifices $a$, $b$, and $c$ are partially uncovered, as shown in Fig. 1, there will not be the same proportionate quantity of water issuing from the orifices as when the level is entirely above the orifices. Figs. 3 and 4 show the means which may be employed to remedy this inconvenience. From these figures it will be seen that the orifices in question, $a$, $b$, and $c$, are covered with a simple shell or case $d$, which is fed by means of an intermediate vessel $e$, immersed in the distributing tank or vat A and connected with the said shell $d$ by a flexible tube $f$. The vessel $e$ is open at the top, and is provided with any suitable means for guiding it in its up-and-down movements, such as the guide-rod $g'$, attached to the vessel $e$, and the guide $g$, supported by the tank A. A partition $h$, inclosing the opening of the flexible tube $f$ into the vessel $e$, extends down to a short distance from the bottom of the vessel $e$, and this partition $h$, with the tube $f$, shell $d$, and the cocks of the orifices $a$, $b$, and $c$, constitute a sort of siphon. So long as the tank receives a sufficient quantity of water to feed the orifices $a$, $b$, and $c$ the level $m$ $n$ remains above the top edge of the vessel $e$, Fig. 3, but if at any time it should happen that the tank A receives less than is discharged through the orifices $a$, $b$, and $c$, as soon as the level $m$ $n$ gets below the top of the vessel $e$ the siphon will empty this vessel $e$, which, being thus converted into a float, will rise to the top and take up the position indicated in Fig. 4. At this juncture the supply from the orifices $a$ $b$ $c$ will be entirely cut off until the level $m$ $n$ rises sufficiently to make the liquid overflow into the vessel $e$, with the result that this vessel will be again immersed, the siphon started, and the cocks of the outlets $a$ $b$ $c$ enabled again to discharge liquid. Thus it will be seen that if the apparatus should happen to receive a quantity of water insufficient for the normal supply the supply will be intermittent instead of being continuous, and irregular, as in the arrangement described in reference to Figs. 1 and 2. Owing to this arrangement, then, it is possible to avoid irregularity and to obtain uniform purification, whatever may be the variations in the supply.

To render the novel arrangement really efficient, it is necessary that the weight of the floating vessel $e$ should be so determined that immersion takes place before the level of the water within the float attains the orifice of the flexible tube, as otherwise the discharge would be due to overflow, without offering the advantages claimed. The apparatus being properly weighted, however, immersion is sure to produce the starting of the siphon, whatever the supply may be, and to secure perfect regularity in the proportional quantities of water discharged from the several orifices.

Whatever the arrangement adopted in the construction of the distributing tank or trough may be, the supply of the cock of the outlet $c$ should serve to regulate also the supply of the solution of the reagent employed, either by displacement or dissolution. In the former case (viz., where the solution is supplied by displacement) the soluble reagent (such as soda, for example) is kept in reserve in a reservoir of sufficient capacity to feed the apparatus during the period of time allowed for the automatic operation, say, one month. Thus, supposing that a purifier purifies one hundred cubic meters of water per day and requires fifty grams of soda per cubic meter, the soda-reservoir should have a capacity sufficient to keep in store fifty multiplied by one hundred, equaling five thousand grams of soda per day, or five multiplied by thirty, which equals one hundred and fifty kilograms per month. Taking for a basis a daily supply of fifty liters of solution containing five kilograms of soda, in the example herein selected, a soda-reservoir of a capacity of fifteen hundred liters will be required, a capacity which it is very easy to provide in the upper portion of the installation or plant. It will be observed, by the way, that this supply of fifty liters per twelve hours may readily be made uniform and constant through the medium of the water, while a direct supply of soda corresponding to so limited a consumption would be liable to continual obstruction, either by crystallization or by the deposits or sediments which form when the solution of soda is prepared with impure water.

Figure 5:
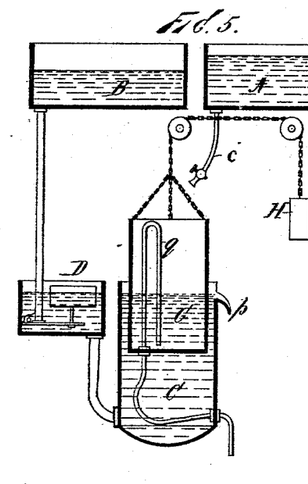
Fig 5 is a sectional view of the apparatus for distributing and measuring the supply of reagent.

Fig. 5 illustrates the method of distribution or supply of the reagent. In this figure, A is the water-distributer to be dealt with; B, the reagent-reservoir. $c$ is the outlet supplying the water which is to regulate the discharge of the reagent solution. The reservoir B, containing the reagent, is in communication with a distributing vessel C through the medium of a reservoir D. In the vessel C and reservoir D a constant level is kept up by means of a float-valve controlling the supply from the reservoir B, and which is so regulated that when the apparatus is out of operation the level of the liquid remains somewhat below the orifice $p$, through which the reagent is discharged from the vessel C. A receiver or float G, balanced by a counterweight H, movable to a limited extent, is suspended above the distributer C in such a manner that its bottom is only just immersed in the liquid when such receiver G is empty. This float or vessel G contains a siphon $q$, traversing the bottom and extended by a flexible tube to the outside of the vessel C. Such being the arrangement, when the vessel G is empty the solution of the reagent or (in this case) the soda solution completely fills the vessel C up to a short distance from the outlet $p$, so that no discharge takes place. As soon as water begins to escape through the regulated cock of the outlet $c$ the vessel G, as it becomes heavier, plunges deeper into the vessel C, thereby causing an overflow of its contents; that is to say, the soda is forced out by the weight of the water discharged by the cock of the outlet $c$. When a considerable quantity of water is thus discharged, the quantity of reagent discharged at the same time will be correspondingly larger. When the apparatus is no longer supplied with any water, the supply of reagent stops altogether. In a word, the supply of soda is exactly proportionate to that of the water.

When the vessel G reaches the limit of its downward movement, the siphon $q$ starts of its own accord, being constructed in such a manner that it does not simply act as an overflow, and owing to its dimensions and to the difference of level existing between the two branches it very rapidly empties the receiver G, which, under the action of the counterweight H, instantaneously resumes its position at the top, while the solution of soda supplied by the regulator or governor D again fills the reservoir C, thereby making it ready for the next period or stage of operation. The operation will continue the same so long as there remains any solution of the reagent in the reservoir B, and it may not be amiss to point out that the automatic filling of the vessel C need not necessarily take place every day. It depends, in fact, upon the supply, and the quantity of soda discharged always remains proportionate to that of the water supplied by the apparatus. It will be understood that the movement which takes place when the receiver G is filled exercises no appreciable influence upon the operation of the purifier, firstly, because it is not frequent, and, in the second place, because it always takes place in an identical manner. Besides, the perturbation resulting therefrom scarcely lasts one minute in apparatus of medium power.

The sudden discharge from the receiver G supplies a volume of water which may be utilized, as will be seen farther on, to actuate the discharge-orifices of the apparatus, and thus to bring about the automatic cleaning or cleansing of the saturating and decanting apparatus.

Figure 6:
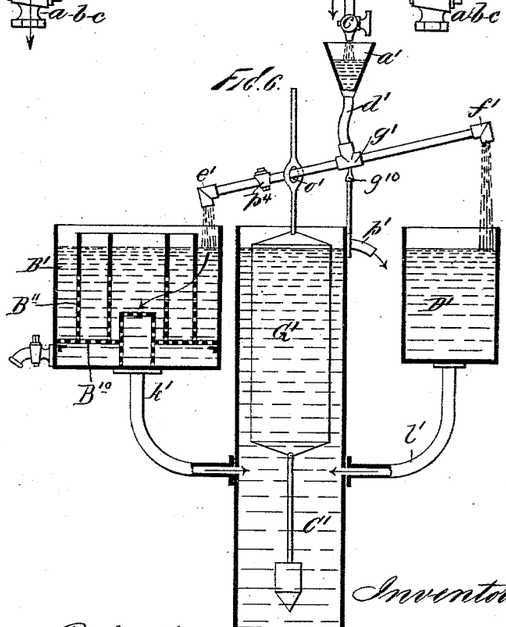
Fig. 6 is a sectional view of a modified construction thereof.

In the second case, that is to say, when there is no soluble reagent in reserve and when the water supply from the outlet $c$ serves to dissolve the soda in proportion as it is required, another arrangement is employed, and the reagent used, instead of being caustic soda, is preferably calcined carbonate of soda. Fig. 6 shows an apparatus for use in such case. In this figure the receiver B', containing the supply of soda kept in reserve, is supposed to be constructed in such a manner as to promote the gradual dissolution of the salt, at the same time avoiding obstruction. This arrangement may comprise for the purpose a false bottom $B^{10}$, suitably perforated, and whereon is placed a double-walled basket or cage $B^{11}$, perforated at the lower part, and into which the salt kept in reserve is introduced. In this case the water discharged by the outlet $c$ regulates the supply of soda. The water is conveyed into a funnel $a'$, connected by a flexible tube $d'$ with a pipe $e'f'$, adapted to oscillate at $g^5$ on a pivot or spindle $g^{10}$. The ends $e'$ and $f'$ are provided with nozzles for the discharge of the water. The nozzle $e'$ discharges the water into the receiver B', which contains the necessary supply of the reagent, while the nozzle $f'$ simultaneously discharges water into another vessel D', but in less quantity than the nozzle $e'$, because of the slant of the pipe $e'f'$. The two currents of water are conducted through the pipes $k'$ and $l'$ and mix in the reservoir C'. This reservoir contains a weighted float G', doing duty as an aerometer, and the rod of which engages at $o'$ with the pipe $e'f'$. Upon this pipe is placed a runner $p^4$, which enables the arrangement to be properly balanced, so as to correspondingly regulate the density of the reagent. If the solution be charged with an excessive quantity of salt, on issuing from the vessel B' the density of the mixture will increase within the reservoir C', and consequently the aerometer G' will rise, raise with it the nozzle $e'$, and lower the nozzle $f'$. The water supply to the vessel D' will therefore increase as the pipe $e'f'$ becomes more nearly horizontal, while the supply to the soda-reservoir will diminish and the required equilibrium will be restored. In practice the movements of the aerometer G' are not perceptible, and the solution discharged from the orifice $p'$ retains the uniform degree of concentration.

Figure 7:
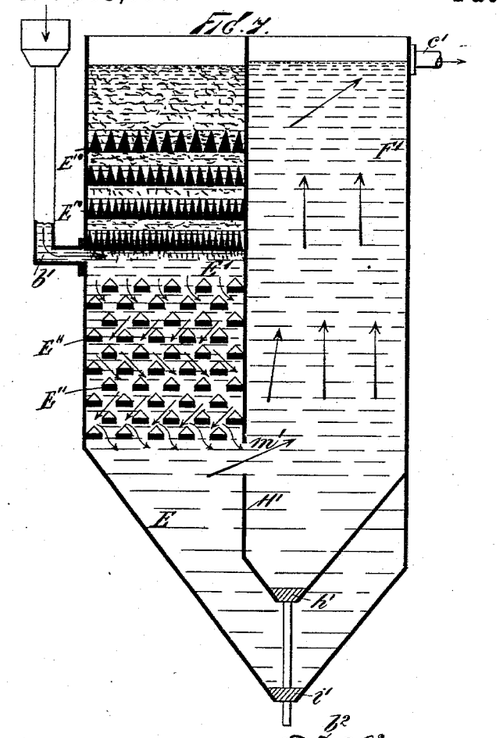
Fig. 7 is a sectional view of the apparatus for saturating part of the supply of water with lime.

Fig. 7 shows the portion of the apparatus which I term the "automatic and continuous saturater," i. e., the device through which the required quantity of lime, kept in reserve, is admitted into the purifying apparatus. This arrangement, unlike those existing in the apparatus hitherto used, avoids localizing the lime at the bottom of the saturater. The water to be saturated with lime is supplied from the distributing trough or tank A through the outlet $b$, Figs. 1 and 3. It is introduced, Fig. 7, through one side of the saturater E, at $b'$, a certain distance from the upper edge of the saturater. The saturater E is a vessel of any suitable shape, having a conical bottom and divided into two compartments E' and F', provided with discharge-valves $h'$ and $i'$, which may or may not be operated by the same rod. The compartment E' communicates with the compartment F' by an aperture $m'$, provided toward the lower part of the partition H'. The discharge of the saturated liquid takes place through the outlet $c'$. Above the orifice of the inlet-pipe $b'$, which feeds the water to be saturated, the compartment E' is fitted with a number of superposed bars or knife-edges $E^{10}$, forming grates, the thickness of which and the distances at which they are placed apart gradually increasing toward the upper part. Below the orifice $b'$ the compartment E' is fitted with flat grates E'', consisting of bands of sheet metal which in the drawings are supposed to be in the form of half-lozenges, but which may be arranged in lozenge form. All these grates are movable (or removable) and simply rest upon stationary supports on the walls of the apparatus. Such being the arrangement, the entire quantity of lime kept in stock is placed at once upon the upper grate of the compartment E', where there is provided a sufficient space for this purpose. The lime is slaked, hydrated, and diluted, so as to form a kind of paste or pulp. If this pulp were placed upon ordinary perforated sheets of metal, as in the apparatus used hitherto, it would obstruct the perforations, but by reason of the peculiar shape of the grates such obstruction is obviated, and in proportion as the lime descends below the lowermost grate the pulpy mass is divided by the intersecting bars or bands of the grates and continues slowly to descend toward the bottom of the saturater. This action is assisted by the current of water entering through the pipe $b'$. The lime which thus descends from the upper grates is stopped by the lower grates, whereon it forms a number of small intersecting ridges or pyramids, between which the water to be saturated will circulate as it passes through the orifices $m'$. These small triangular heaps are gradually washed away by the dissolving action of the water, but they are in the same proportion reformed by the lime descending from the top. Their surfaces, which otherwise would have a tendency to become charged with carbonate of lime, owing to the action of the lime upon the bicarbonate of lime contained in the water to be saturated, is here continually renewed and the dissolution of the reagent takes place in a perfectly methodical manner, while the deposits of carbonate of lime, sand, and insoluble matter descend to the bottom of the vessel, whence they are discharged when the valve $i'$ opens. A certain quantity of lime in excess may also reach the bottom of the apparatus, but if the calculations are properly made and the grates conveniently arranged this surplus of lime may be reduced to a minimum. The reagent is decanted and thoroughly clarified in the compartment F' and then discharged through the orifice $c'$.

Figure 8:
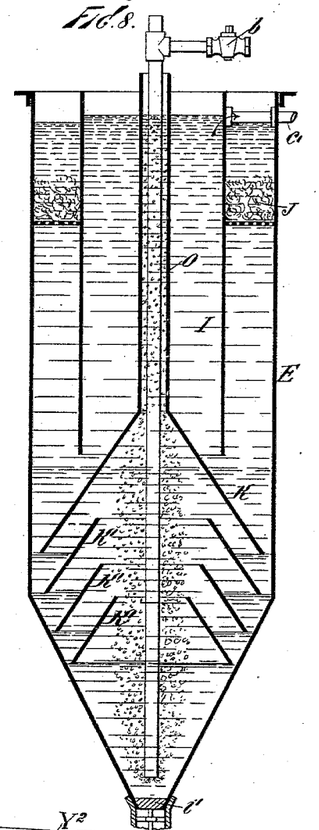
Fig. 8 is a modification of this apparatus.

Fig. 8 shows another arrangement whereby automatic saturation may be obtained without any mixing or the assistance of hand-labor during long periods of time. In this figure E is the saturating vessel, I an internal jacket, and J an annular grate whereon the lime is discharged in lumps, such grate leaving above it a space calculated to admit of the introduction and slaking of the supply of lime which it is desired to convey into the apparatus. A central cone K is surmounted by a tube O, open at the top and into which extends the pipe which feeds the water to be saturated, the discharge of such water being controlled by the cock of the orifice $b$ of the distributing trough or tank A. Other cones K', the number of which may vary, are arranged at the bottom of the apparatus, below the cone K, in such a manner as to leave a small space between their lower edges and the walls of the saturater. The crude lime, as it is spread over the grate, is bathed or moistened with water and thereby slaked, diluted, and caused to descend into the annular space. Instead of directly collecting at the bottom, as it does in all the apparatus hitherto employed, and as it has always been required to do, it is here retained by the cones whereon it stops as long as may be possible, that is to say, instead of being conducted to the bottom of the apparatus its descent is checked, so as to avoid any obstruction of the conical bottom and consequently of the apparatus generally. This has an effect of paramount importance, owing to which an enormous quantity of lime may be introduced into the saturater, any collapse, which would be injurious to the proper operation of the apparatus, being avoided. A further advantage consists in the fact that the air carried away by the water-supply pipe, situated in the center of the tube O and open at the top, rises within that tube O without disturbing the decanted reagent. The air is, moreover, utilized in order to facilitate the process of bringing the lime at the bottom of the saturater into a state of suspension. Instead, therefore, of trying to avoid carrying away the air through the water-supply pipe, everything is done to facilitate its being thus carried away, that is to say, every endeavor is made to draw along as much air as possible at the bottom of the apparatus, so as to bring about under the lower cones a thorough mixture of the water and lime, and avoid collapse and obstruction. This action of the air is so efficacious and energetic that in the course of the experiments made it has been found that the tube O is constantly filled with solid lime suspended in water (milk of lime) up to its upper end. The water arriving at the bottom of the saturater should, after this thorough mixture thereof with the lime has taken place and after it has thereby been saturated, pass between the edges of the cones and the wall of the vessel E, which will further facilitate the dissolution of the reagent, while at the same time this rising movement retards the descent of the lime. Complete clarification then takes place in the annular space comprised between the tube O and the inner jacket I, the clear reagent being discharged through the orifice $c'$, to be further utilized. In regard to the clarification of the reagent it should be here observed that there is no necessity to try to retain in the saturater anything except non-dissolved lime. The fact is that if the current of the reagent carries away in a state of suspension the carbonate of lime formed in the saturater by the action of the lime upon the impure water to be saturated, the beneficial effect of this will be to free the saturater from the residues which, by that time, will have become useless and will only be apt to interfere with the saturation by retarding, by their very presence, the dissolution of the lime. As the lime settles far more rapidly and easily than these precipitates of the carbonate of lime, it will be possible to calculate the dimensions of the saturaters, so as to insure the said precipitates being carried away to the decanting apparatus.

Figures 9, 9A, 11, 12:
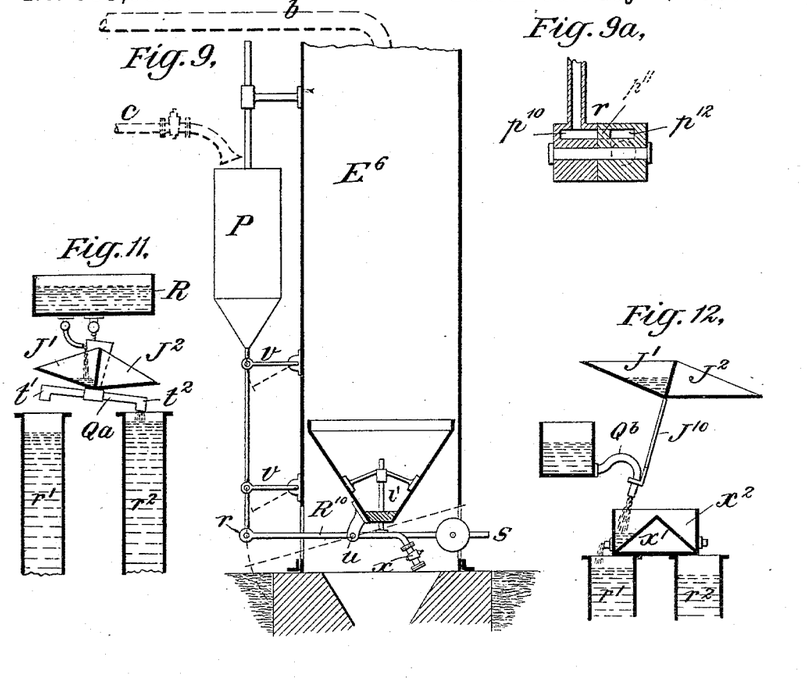

Fig. 9 shows the arrangement employed for the automatic discharge from either the saturater or the purifying vessel in apparatus of this class. In this figure $i'$ is the discharge-valve of the saturater, or the valve of any purifying vessel which it may be desired automatically to control. This valve is connected with a lever $R^{10}$, linked or pivoted at $u$ and capable, if need be, of being operated by hand. At the end $s$ there is a counter-weight, the effect of which is to keep the valve $i'$ upon its seat and thereby to insure the closing thereof. At the end $r$ there is arranged a vessel P, mounted vertically upon jointed levers $y$, counterbalanced by the weight situated at $s$ and made to receive at a certain moment a sufficient quantity of water to cause the lever $R^{10}$ to swing over and open the discharge-valve $i'$. I have shown in dotted lines the receiver P as being supplied from the outlet $c$ and the vessel $E^6$ from the outlet $b$, but in practice the water supplied to the receiver P may be that discharged from the soda-distributer C, Fig. 6, through the siphon $q$, as described above, or water from the alternator described hereinafter. The rod connecting the receiver P to the lever $R^{10}$ consists of a tube which is provided at $x$ with a cock, the aperture of which is regulated once for all. The joint at the end $r$ is also, moreover, constructed in the shape of a cock, Figs. 9 and $9^a$, which in the position in which it is shown in Fig. 9 is closed, but which opens automatically when the vessel P descends under the weight of the water.

Referring to Fig. $9^a$, when the receiver P is raised the opening $p^{10}$ does not register with the opening $p^{11}$, which leads through the passage $p^{12}$ to the passage in the lever $R^{10}$ and to the cock $x$. It will therefore be seen that as soon as the receiver P has sunk the water which it contains escapes through the cock $x$, so that, at a certain moment, the counterweight at $s$ becomes preponderant and brings the valve $i'$ back to its seat. By opening the cock $x$ more or less the valve $i'$ also is kept open for a longer or shorter space of time, so that the time occupied in discharging may thus be controlled and varied at will. The number of discharging operations, on the other hand, is always proportionate to the volume of the water purified, inasmuch as the weight of the water by which the discharge-valve is operated is itself properly proportioned to the supply from the apparatus.

Figure 10:
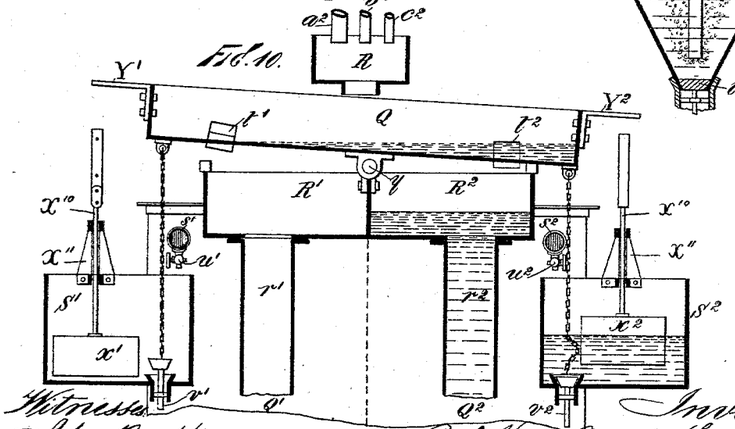
Fig. 10 is a sectional view of the decanting apparatus.

Fig. 10 shows the continuous "decanter," which, unlike similar apparatus used hitherto, comprises a novel combination based on the principle of clarifying liquid by keeping it absolutely at rest for a time, and while drawing it off circulating it in thin sheets between decanting-diaphragms. This decanter comprises two distinct compartments $Q'$ $Q^2$, whence I derive the term "compound purifier," by which I designate the whole of the decanting apparatus, and an alternator adapted automatically and successively to feed the said compartment during a predetermined period of time, without there being any interruption either in the supply of liquid to be decanted or in the discharge of the clarified liquid. In other words, the water to be purified is sent at one time into one compartment and at another time into the next compartment of this compound decanter, so that one is in operation while the other remains in a state of absolute rest.

In Fig. 10, which more especially shows one of the forms of the alternator, a centrally-partitioned trough or tank $R'$ $R^2$ is arranged for feeding the two compartments $Q'$ $Q^2$ by means of two separate pipes $r'$ $r^2$. Above the trough $R'$ $R^2$ there is arranged another similar trough Q, herein termed the "alternator," which is adapted to oscillate upon a pivot or spindle $y$. This trough or tank Q is provided with two orifices $t'$ and $t^2$, through which the liquid to be decanted is discharged. These two outlets are situated at a certain distance from the bottom, so that the tank can in no case empty itself entirely, but always retains a certain quantity of liquid for a purpose presently to be stated.

R is a mixing-tank, which receives from the pipes $a^2$ $b^2$ $c^2$ the water to be clarified, the lime-water, and the soda solution. The mixture, after having been properly prepared for purifying purposes, descends into the tank Q, whence it is discharged. The said tank being in the position indicated in Fig. 10, the discharge takes place through the overflow $t^2$, the liquid flowing down into the compartment $R^2$ of the tank or trough $R'$ $R^2$, whence, passing through the pipe $r^2$, it feeds the compartment $Q^2$ of the compound decanter. It follows that the clarified water contained in the said compartment $Q^2$ issues through orifices $s^2$. Below this outlet $s^2$ there is provided a small cock $u^2$, which allows a small quantity of the clarified water to escape into a stationary vessel $S^2$, provided with a discharge-valve $v^2$, controlled through the medium of a chain from the alternator Q and which, while in the position in which it is shown in Fig. 10, continues closed. A float $x^2$, arranged within the vessel $S^2$, rises with the level of the water, and its rod $x^{10}$, working in guides $x''$, eventually raises a tappet $y^2$, provided at the right-hand end of the alternator Q, thereby tending to overturn the latter. As soon as the level of the liquid contained in the alternator Q has displaced the center of gravity a sudden swinging movement takes place and the direction of feeding of the purifier is reversed, that is to say, without the supply being for a moment interrupted, the liquid to be clarified now flows through $t'$ into the compartment $R'$, which feeds the compartment $Q'$ of the decanter by the pipe $r'$. At the end of this movement of the alternator $Q$ the valve $v'$ is closed, the valve $v^2$ is raised, and the water in the vessel $S^2$ is discharged into the tubing conducting the purified water or elsewhere, so as to be in readiness for fresh operation. All that has taken place on the right is now repeated on the left, and after the operation has been thus kept up for a certain space of time the supply automatically ceases in the compartment $Q'$, but starts in the compartment $Q^2$, and so on. By regulating the apertures of the cocks $u'$ and $u^2$ the duration of the alternate periods of operation may be regulated at will. Supposing now that the cocks $u'$ and $u^2$ are so regulated as to cause the alternator to swing over, say, every half-hour. The result will be that each decanter will be fed for half an hour and that then its feeding will be stopped for the next half-hour. During the interruption of the feeding, clarification will take place owing to the liquid being at absolute rest, while during the feeding the water clarified during the period of rest will be discharged. This peculiar arrangement produces the following results: First, decantation takes place more rapidly, comparatively speaking, since the liquid is kept absolutely at rest instead of in motion; second, the clarification is more thorough, for it will be understood that the precipitates are allowed better and more fully to settle while the liquid is at rest than while it circulates. The decantation of the liquid is such that filters are not needed to complete the purification.

Figures 14, 15:
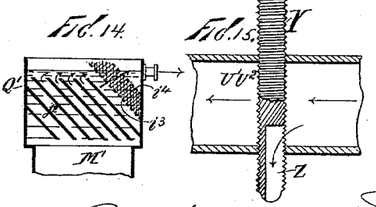
Fig. 14 is a sectional view of a modification of part of the decanter, drawn to a smaller scale.
Fig. 15 is a sectional view of a cock used in this apparatus.

If, however, it be necessary to supplement the decanter by a filter, as might be desirable in the case of liquids containing lighter materials than water, or if it were desirable to attain perfect limpidity, for drinking-water, for example, this filter might be readily formed for this purpose. As shown in Fig. 14, the last diaphragm $j^2$, situated near the front wall of the decanter, would be replaced by two perforated metal plates $i^3$ $i^4$, inclined like the diaphragms, and between which the filtering material would be placed. The water passing between these diaphragms would then permeate the filtering material, it being understood that in that case it would issue on the sides and the outlet would be placed upon the front wall of the decanter, unlike what has been stated in reference to the apparatus without a filter. It will be observed that the arrangement of this filter enables the filtering material to be washed or renewed without taking to pieces or in any way disturbing the grates.

Figure 13:
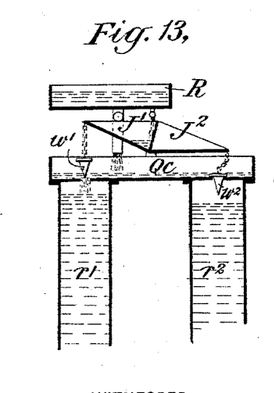

The alternator may be modified, as indicated by diagrams in Figs. 11 to 13.

Fig. 11 shows a tube $Q^a$, fed from the mixing-tank R, the swinging or rocking movement of which is obtained by the aid of two coupled or twin basins $J'$ and $J^2$, integral with the said tube, and receiving a portion of the liquid from the trough or tank R. These basins are arranged in such a manner that while one is discharging liquid the other is filling, by which filling the equilibrium is destroyed and the whole arrangement swung over. By such means the tube $Q^a$ discharges the liquid alternatively into the inlets $r'$ $r^2$ of the compartments $Q'$ and $Q^2$ of the decanter.

Fig. 12 shows a modification of the alternator, wherein the tube $Q^a$ is replaced by a flexible tube $Q^b$, connected with the coupled basins $J'$ and $J^2$, above referred to, by the arm $J^{10}$, the swinging or rocking of these basins causing the end of the said tube $Q^b$ to be moved in front of either one or the other of the two inclines $x'$ $x^2$, adapted to direct the liquid to be clarified alternatively into the compartment $Q'$ and $Q^2$ through the medium of the pipes $r'$ and $r^2$.

In Fig. 13 the oscillating coupled basins $J'$ and $J^2$ have their respective ends connected by chains to valves $w'$ and $w^2$, arranged at the bottom of a stationary channel or conduit $Q^c$, into which the liquid to be clarified is discharged from the mixing-tank R. The basins always receive a small jet of liquid capable of setting them in motion. Under their influence, as they oscillate, the valves are alternately raised from their seats, and the liquid is alternately discharged into the compartments $Q'$ and $Q^2$ of the decanter.

Figure 16:
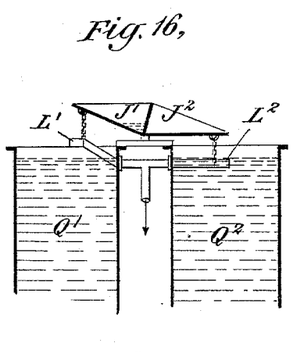
Fig. 16 is a sectional view of a device for acting upon the discharge-orifice of the decanter.
Figure 17:
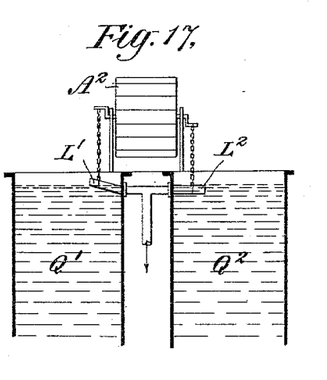
Fig. 17 is a modification thereof.

Figs. 16 and 17 show a simple arrangement to act upon the discharge-orifices of the compartments of the decanter. In this case the said orifices are formed by flexible tubes $L'$ and $L^2$, connected by chains to the ends of the pair of basins $J'$ and $J^2$, Fig. 16, or to cranks keyed onto the shaft of a paddle-wheel $A^2$. Fig. 17, which receives a jet of the same liquid to cause it to continuously revolve.

In any case, and whatever the arrangement of the alternator may be, it will be seen that the decanter comprises two twin parts or compartments $Q'$ $Q^2$, operating alternately. It should also be borne in mind that this arrangement of the decanter does not increase the volume or size of the whole plant; quite the contrary, in fact, as the discharge of the decanted water takes place more rapidly and as a greater quantity thereof is discharged in a given space of time. Upon the whole, the volume of (or space occupied by) the compound decanter may be less than that of a single decanter, provided always that those limits are observed which correspond to the time required for completing the chemical reactions.

For the purpose of regulating the different phases of operation of the alternator it is possible to employ, instead of an ordinary cock, apt to be operated or closed carelessly, an arrangement such as is shown in Fig. 15. In this figure it will be seen that the pipes $U'$ and $U^2$, which are to discharge the purified water, instead of being, like the tubes $s'$ and $s^2$, provided with cocks $u'$ and $u^2$, as indicated in Fig. 10, for example, have each a square-headed screw Y passing through them, the lower portion of which screw is provided with a lateral groove or recess $z$. By turning this screw one way or the other the side of the discharge-aperture may be increased or reduced, and such adjustment may be very precise, as the aperture may be reduced to a minimum. It will also be seen that an adjustment once adapted cannot be changed without the employment of a special key or spanner, and that, in case of accidental obstruction, the removal of such obstruction or the cleaning of the apparatus is very easy.

I will now describe a complete water purifying and clarifying apparatus comprising the several arrangements above described.

Figure 18:
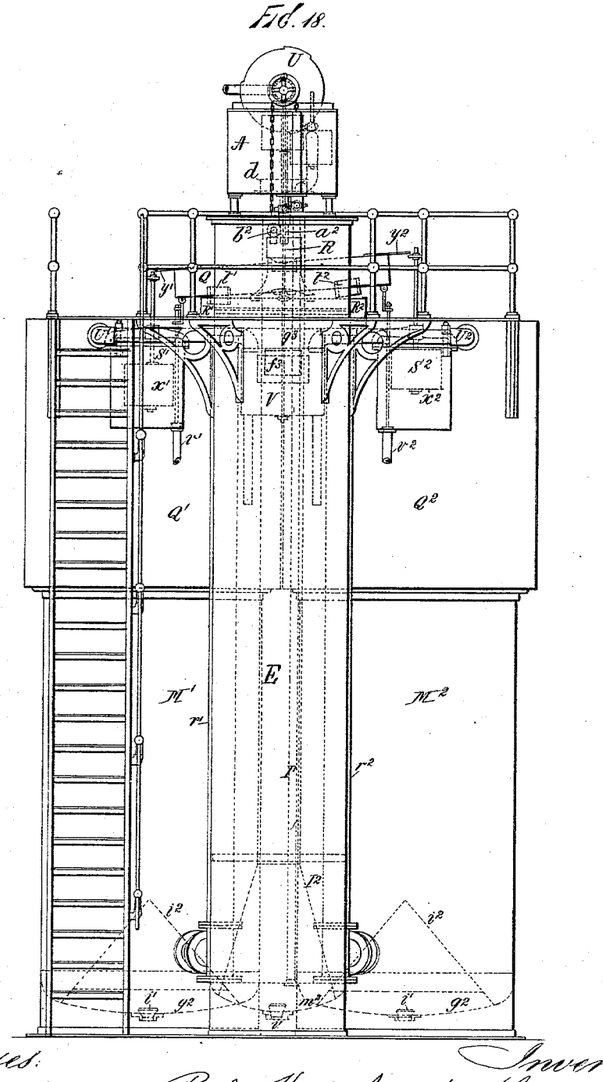
Figs. 18, 19, and 20 are respectively a front elevation, side elevation, and plan of a compound purifier and its accessory parts according to this invention, these three figures being drawn to a smaller scale than the other figures.
Figure 19:
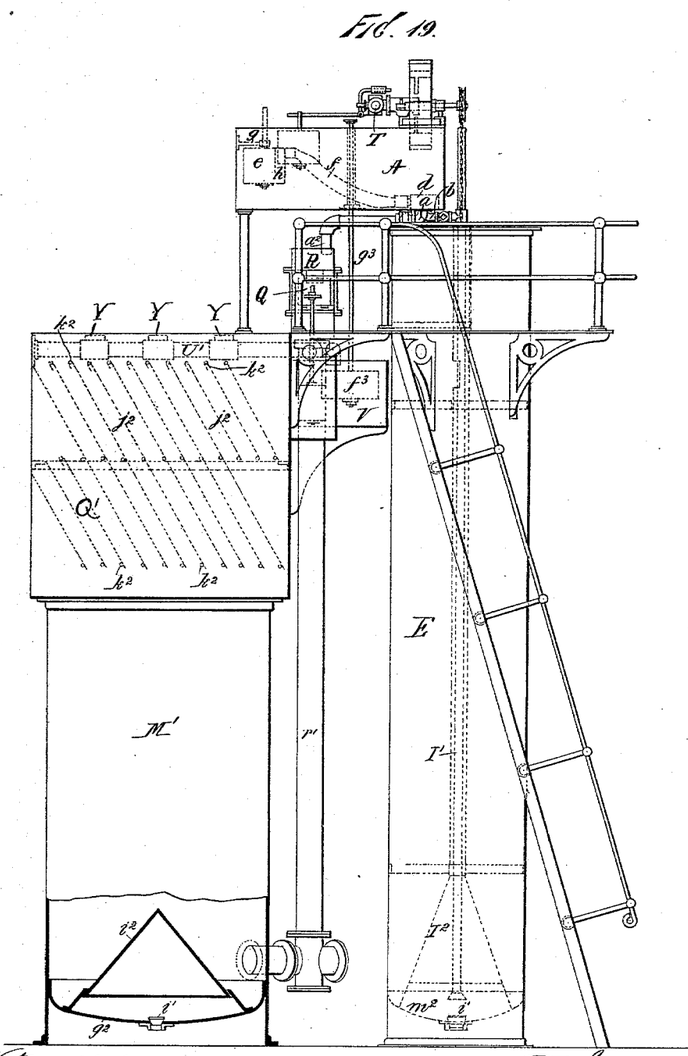
Figure 20:
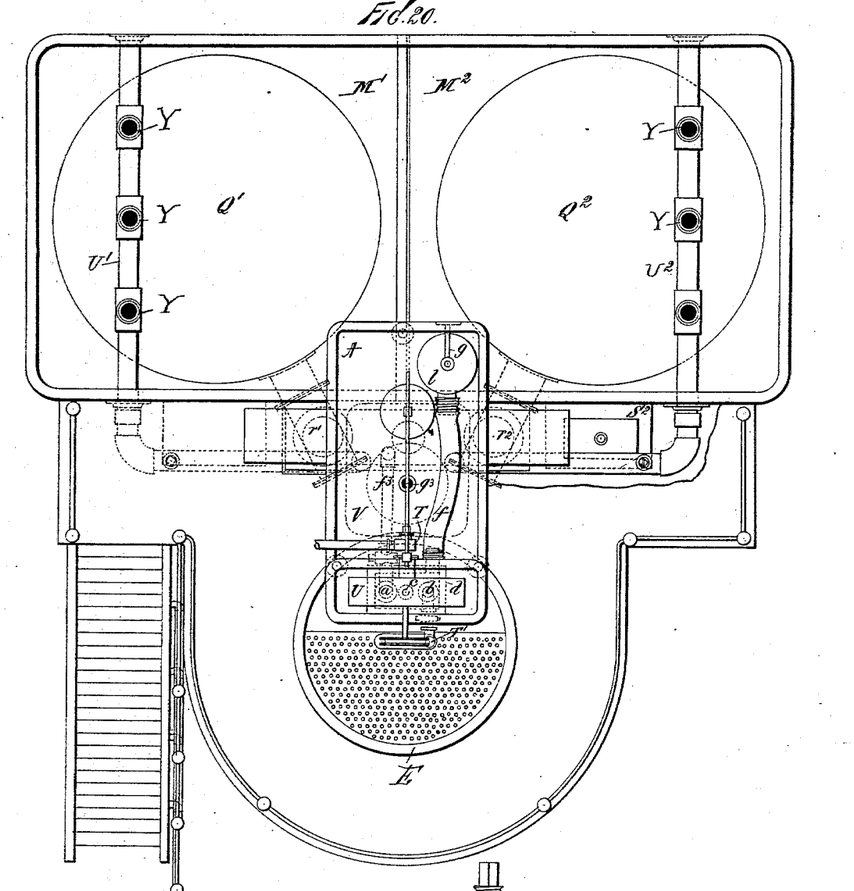

Figs. 18, 19, and 20 are respectively a front elevation, side elevation, and plan, of a compound purifier with its accessory parts. In these figures the purifier comprises two cylindrical reaction-compartments $M'$ and $M^2$, respectively, surmounted by the rectangular decanting-compartments $Q'$ and $Q^2$. The rectangular shape is preferably given to these compartments in order to facilitate the construction of the decanting-diaphragms, which may thus consist of rectangular sheets of metal, as will be seen farther on. Upon the bottoms of the compartments $M'$ $M^2$ there are arranged cones $i^2$, which cause the current of water to sweep or flush the bottom when the discharge-valves $i'$ are opened, thereby causing the deposits or sediments which may have formed therein to be removed. The external pipes $r'$ and $r^2$, which receive the water to be treated from the alternator above described in reference to Figs. 10, 11, 12, and 13, (for the complete views the arrangement shown in Fig. 10 has been chosen,) feed the respective compartments of the decanter. These pipes, instead of being arranged externally, might be arranged internally, especially in those cases where the cylindrical shape only is used in constructing those compartments. The alternator itself receives the liquid from the mixing trough or vat R, into which the pipe $a^2$ conducts the water to be treated, which it receives from the supply-trough A, while the pipe $b^2$ supplies it with lime-water from the saturater, the arrangement of which has been described in reference to Figs. 8 and 9, and while a third tube provides it with the reagent, (soda in solution, supplied by the automatic reagent-distributer, the arrangement of which has been described in reference to Figs. 5 and 6.) In the compartments $Q'$ and $Q^2$ of the decanter the decanting-diaphragms, which are entirely removable, consist of rectangular sheets of metal $j^2$, Fig. 19, the edges of which may be either raised or not, as the case may be, and which are hooked onto rods $k^2$. These rods themselves engage in suitable eyes or in perforations provided for the purpose in angle-irons, and so arranged as at the same time to serve as supporting-frames for the decanter, they being parallel and symmetrically disposed. The metal sheets or plates $j^2$ may be fitted in position in various ways, either like the tiles of a roof or so as to form continuous surfaces from one wall to the other, or, again, in lozenge shape, so as to be capable of causing the sheets of liquid to come into contact with each other, or in any other suitable manner. The clarified water is discharged by means of pipes $U'$ $U^2$, enabling water to be drawn from different points of the surface. The orifices of these pipes are provided with nozzles opening in a horizontal plane and adjustable by means of screws Y. In this manner a perfectly-regular discharge may be obtained and the upper layer of the water, which naturally is most thoroughly clarified, is regularly and smoothly removed. This is an important advantage, as the lateral nozzles or lengths of tube hitherto used have frequently created currents interfering with the decantation.

The saturater E (represented in Figs. 18, 19, and 20) has a flat or hollowed-out bottom $m^2$. To insure the discharge of the residues, the central pipe $I'$ is provided at its lower part with a conical enlargement $I^2$, which acts in the same manner as the additional cone mentioned above in reference to the discharge from the decanters. The plant furthermore comprises the water-supply tank or trough A, with its three regulating or controllable orifices $a$, $b$, and $c$, mounted upon the shell $d$ and provided with the floating siphon $e\ h\ f$, described above. The water to be treated is discharged by the automatic valve T, after which it may or may not pass through a meter U, operated by a chain, and eventually feed the different parts of the apparatus.

Figs. 18, 19, and 20 represent a vessel or receiver V, fixed against the wall of the decanter and connecting the two water-outlets of the two compartments of the compound apparatus. From this vessel V the purified water is fetched for further use. Besides, it contains the automatic regulating-float $f^3$, the rod of which, $g^3$, directly operates the lever $g^4$ of the water-inlet valve. This rod is guided in its motion by a simple tube traversing the distributing or supply tank A.

I claim as my invention—

1. In a water-purifying apparatus, the combination of two decanters of like construction, each being divided into two compartments the lower compartment serving for reaction, the upper one for decantation, with an alternator adapted to receive the liquid to be treated, and to automatically discharge it into the lower part of the two decanters alternately, substantially as and for the purposes set forth.

2. A tank for distributing liquid in regular proportionate quantities, the said tank being provided with discharge-orifices of sizes in the required proportion, the said orifices being incased, in combination with a floating siphon one end of which opens into the incasing shell of the said orifices, substantially as and for the purposes set forth.

3. A tank for distributing liquid in regular proportionate quantities the said tank being provided with discharge-orifices of sizes in the required proportion, the said orifices being incased, in combination with a siphon, one end of which opens into the incasing shell of the said orifices, and provided at the other end with a floating vessel so weighted that immersion takes place before the siphon is started, all substantially as and for the purposes set forth.

4. In an apparatus for purifying water, the combination of a tank provided with means for automatically distributing currents of water in proportionate quantities, with a reagent-reservoir and a device for regulating the discharge of the reagent, and means for actuating the said device by one of the currents of water from the said tank, whereby there is a discharge of reagent always in proportion to the amount of water treated, substantially as and for the purposes set forth.

5. In apparatus for purifying water, the combination of a water-tank provided with discharge-orifices of proportionate sizes for automatically distributing proportionate quantities of water, with a device for supplying a reagent always in proportion to the amount of water treated, the said device consisting of a reservoir for a solution of the reagent, a vessel connected to the reservoir, a regulator in the connection and a float in the said vessel, means for discharging into the said float, the water from one of the said proportionate orifices of the water-tank to control its position, and a siphon in the float, one end of which extends to the outside to periodically discharge the water received, substantially as and for the purposes set forth.

6. In an apparatus for purifying water, the combination of a water-tank provided with discharge-orifices of proportionate sizes, a device for supplying a reagent in proportion to the amount of water to be treated, and means whereby the said device is actuated by a current of water from one of the said orifices, with a saturater comprising a chamber divided into two compartments communicating with each other at the lower part, one of the compartments provided with an inlet connected to another of the distributing-orifices of the said tank and provided with grates to retain material with which the water is to be saturated, the other compartment being provided with an outlet at the top, all substantially as and for the purposes set forth.

7. In a water-purifying apparatus, the combination of a tank provided with discharge-orifices of proportionate sizes for automatically distributing proportionate quantities of water, and a vessel through which the water treated passes, with a device for periodically and automatically discharging the residues accumulating in the bottom of said vessel, and means for actuating the said device by water from one of the said discharge-orifices of the said tank, whereby the number of operations is in proportion to the amount of water treated, substantially as set forth.

8. In a water-purifying apparatus, the combination of a tank provided with discharge-orifices of proportionate sizes for automatically distributing proportionate quantities of water, and a vessel through which the water treated passes with means for discharging the residues accumulating in the bottom of the vessel, the said means consisting of a valve at the bottom of the said vessel, a receiver balanced by a counterweight, means for discharging water into the receiver from one of the discharge-orifices of the said tank, a pivoted pipe so connected to the receiver as to be turned on its pivot by the weight of water in the receiver, the said pipe adapted to operate the said valve, and an outlet from the said receiver and a valved connection between the outlet and the pipe, the said valve being adapted to be opened when the pipe is turned, to empty the receiver, all substantially as and for the purposes set forth.

9. In a water-purifying apparatus, the combination of two decanters alike in construction, with an alternator adapted to automatically discharge the liquid to be treated into the decanters, alternately, the said alternator comprising a swinging trough, adapted to receive the liquid to be decanted, and provided with openings, each adapted to convey the liquid to one of the decanters, according to the direction in which the trough is tilted, two vessels each adapted to receive a portion of the liquid leaving one of the decanters, floats in the said vessels, and means operated by the said floats to tilt the swinging trough, and outlet-valves in the vessels adapted to be operated by the swinging trough, all substantially as set forth.

10. In a water-purifying apparatus, a decanter provided with rods serving as supporting-frames, in combination with removable decanting-plates consisting of metal sheets provided with means for hooking them onto the said rods, all substantially as set forth.

11. In a water-purifying apparatus, a decanter provided with a pipe passing through the top of the decanter and having an outlet to the outside of the apparatus, the said pipe having openings therein at different points in the decanter and in a horizontal plane, and means for varying the size of the said openings, substantially as and for the purposes set forth.

12. In a water-purifying apparatus, a decanter provided with rods serving as supporting-frames, in combination with removable decanting-surfaces consisting of metal sheets provided with means for hooking them onto the said rods, and a filter interposed between two of the said surfaces, substantially as set forth.

13. In a water-purifying apparatus, the combination of two decanters with an alternator adapted to automatically discharge the liquid into the two decanters alternately, means for operating the said alternator by a portion of the water leaving the decanters, outlet-pipes from the decanters, and screws passing crosswise through the said outlet pipes, each of the said screws being provided with a lateral groove at one end, all substantially as and for the purpose set forth.

In testimony whereof I have signed my name to this specification in the presence of two subscribing witnesses.

PAUL HENRI AUGUSTE GAILLET.

Witnesses:
GUSTAVE ELIE ROUSSIEZ,
AUGUSTE MORET.